Jan. 8, 1935. W. H. HUTCHINS ET AL 1,987,193
CIGAR LIGHTER
Filed July 11, 1930 2 Sheets-Sheet 1

Inventors
William H. Hutchins
and Thomas L. Lee
By
Spencer Hardman & Fehr
Their Attorneys Jan. 8, 1935.   W. H. HUTCHINS ET AL   1,987,193
CIGAR LIGHTER
Filed July 11, 1930   2 Sheets-Sheet 2

Inventors
William H. Hutchins
and Thomas L. Lee

Spencer, Hardman & Fehr
Their Attorneys

Patented Jan. 8, 1935

1,987,193

UNITED STATES PATENT OFFICE 1,987,193

CIGAR LIGHTER

William H. Hutchins and Thomas L. Lee, Rochester, N. Y., assignors to North East Appliance Corporation, Rochester, N. Y., a corporation of New York Application July 11, 1930, Serial No. 467,279

8 Claims. (Cl. 219—32)

This invention relates to improvements in electric cigar lighters including an electrically heated detachable unit.

One object of the present invention is to provide a durable and inexpensive device which is composed of few parts, and is efficient in operation. In the disclosed embodiment of the present invention this object is accomplished by providing a detachable head cigar lighter comprising a base, terminals insulatingly supported by the base, a switch supported by the base and comprising a contact movable into connection with one of said terminals, a heating coil, a head for supporting the coil, means for attaching the head to the base for electrically connecting the heating coil with the terminals, said means comprising a pair of concentric connectors carried by the head each connecting one end of the heating coil and cooperating respectively with a pair of concentric connectors on the base connecting with the switch and terminals.

Further objects and advantages of the present invention will be apparent from the following description, reference being had to the accompanying drawings, wherein a preferred embodiment of one form of the present invention is clearly shown.

Figure 1:
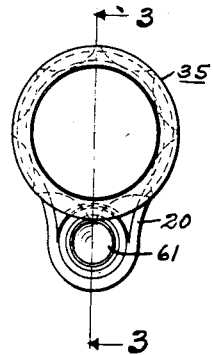
Fig. 1 is a plan view of the assembled device.

Referring to the drawings, the device comprises a holding or supporting member and a detachable member. The holding member comprises a base 20, of any suitable insulating material, which is adapted to be secured to a support (not shown).

The base has an aperture 21 which receives a tubular conductor 22. A socket member 23 is provided with a bottom wall that has angular ears 24 struck inwardly therefrom, for purposes to be described. The bottom wall of the socket member engages one side of the base and is in turn engaged by an annular flange 25 of the tubular conductor 22 thereby electrically connecting the conductor 22 with the socket member 23 and securely attaching the socket member to the base 20. The conductor 22 extends from the side of the base opposite the socket member and through an opening in a resilient contact 26. This end of the conductor is spun over the contact to firmly hold the contact 26 against the base, and thereby electrically connecting the socket member 23 and the contact 26. The base is recessed as at 27 to receive an insulating cover plate 28.

A rectangular insulating disc 29 is provided within the socket member 23. A hole in the disc concentric to the socket member 23 is in axial alignment with a similar hole in the cover plate 28. A terminal stud or post 32 is supported in the holes of the disc 29 and the plate 28, the post 32 having a flanged portion 33 which engages one side of the disc 29. The threaded end of the post 32 extending through the cover plate 28 has a nut 34 thereon, which when tightened draws the flanged portion 33 of the post against the disc 29 to engage between the ears 24 that keeps the disc 29 from turning, and thus holding the cover plate 28 in position and rigidly supporting the post 32 in proper position relative to the socket member 23.

The detachable member 35 is of a knob form construction, preferably made up of a molded condensation product, such as bakelite or the like, and having a cavity therein to form a translucent portion 71. An interior shoulder 36 is provided in the detachable member. An asbestos ring lines the shoulder 36, and a tensioning member or ring 37 engages the asbestos ring. A cup-shaped member 40, having an annular flange 41 engaging the tensioning spring 37, has a depression 42. A plug or connector 43, has an annular flange 44 engaging the flange 41 of the cup-shaped member 40. The tubular portion of the plug is slotted so as to provide four quadrants of a flexible nature. The flange 41 of the cup member is maintained against the tensioning member 37 by a shell member 45 provided with an inwardly extending annular flange 46. The flange 46 engages the flange 44, which in turn engages the flange 41.

A snap ring 47 fitting into an annular groove 48 provided in the interior surface of the open end of the detachable member 35, engages an outwardly turned edge 49 of the shell member 45 and the shell member is adapted to maintain the plug or connector 43 and the socket member 23 in proper position within the detachable member 35.

A heating unit 50 comprises a helical formation of suitable resistance material which, when current is flowing therethrough, will become heated and will glow. One end of the heating unit is in electrical engagement with a hollow rivet or socket member 51, supported by the cup-shaped member 40, but insulated therefrom. The other end of the heating unit 50 has an angular projection 52 which extends through an opening in the depression 42 of the cup-shaped member 40. The terminal post 32 has its free end bifurcated, as at 53, forming two substantially resilient sections. The bifurcated end of the stud 32 is adapted to fit snugly into the hollow rivet or socket member 51, whereby the post is electrically connected with one end of the heating unit 50.

When the detachable member 35 is placed in position upon the base 20, the hollow rivet or socket member 51 will receive the post 32, as has been described, and the slotted end of the plug or connector 43 will engage the socket member 23 of the base 20, so that the outer end of the heating unit 50 will be in electrical connection with the socket member 23 through the cup member 40 and plug 43.

A terminal post 60 is supported by the cover plate 28 so as to be engageable with the spring contact 26. To move the spring contact 26 into engagement with the terminal 60, a push button 61 is provided, which is slidably supported in an opening formed in the base 20.

When it is desired to use the device, the push button 61 is pressed so that the spring blade 26 will engage the terminal 60 completing a circuit through the device through the following elements: ground, 60, 26, 22, 23, 43, 40, 52, 50, 51, 53, and 32 then to a source of current and ground. With the continued depression of the button 61 the current will flow through the heating unit 50, causing the unit to glow which may be seen through the insulating material over a plurality of apertures 70 provided in the bottom wall of the cup-shaped member 40, and thence through the thin portion 71 of the detachable member 35. When the glow is visible the detachable member may be removed from the stationary member. In the removal, the hollow rivet or socket member 51 is removed from the stud 32, and the plug 43 from the cup shaped member 23.

From the foregoing description of the construction of the first form of the invention it is apparent that we have provided a detachable head cigar lighter comprising a base 20, terminals 32, and 60 supported by the base, a switch supported by the base and comprising a contact 26 movable into connection with the terminal 60, a heating coil 50, a head 35 for supporting the coil 50, and means for attaching the head 35 to the base 20 for electrically connecting the heating coil 50 with the terminals 32 and 60, said means comprising a central socket 51 carried by the head 35 and a central plug 53 carried by the base connecting one end of the heating coil 50 cooperating respectively with an annular plug 43 carried by the head and an annular socket 23 on the base connecting the other end of the heating coil with the movable contact 26.

Figure 6:
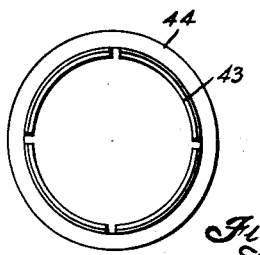
Fig. 6 is a detail view of a sleeve contact member of the device.
Figure 2:
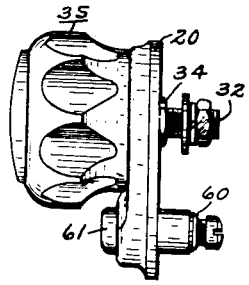
Fig. 2 is a side view of the device.
Figure 3:
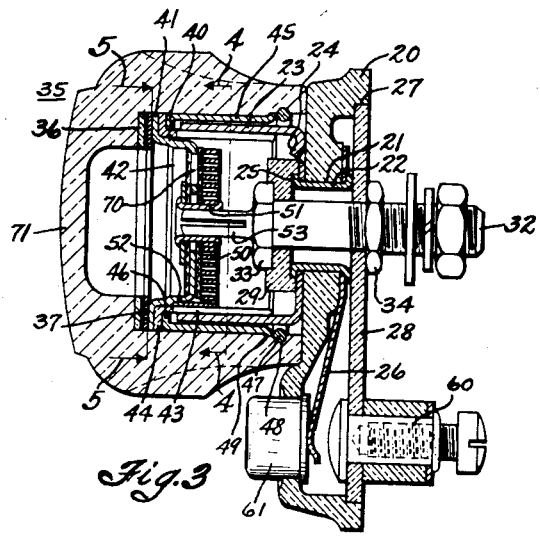
Fig. 3 is an enlarged sectional view taken on the line 3—3 of Fig. 1.
Figure 4:
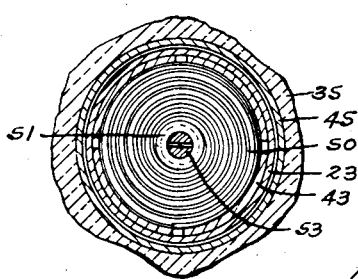
Fig. 4 is a sectional view taken on the line 4—4 of Fig. 3.
Figure 7:
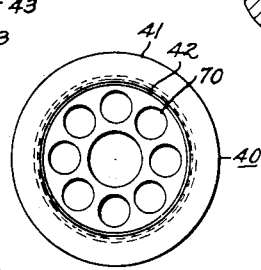
Fig. 7 is a detail view of a heating coil supporting cage.
Figure 5:
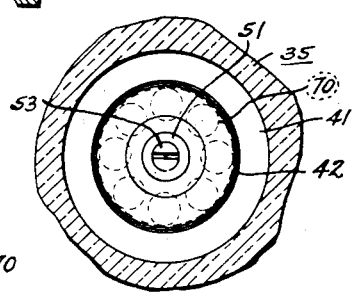
Fig. 5 is a sectional view taken on the line 5—5 of Fig. 3.

Referring to 8 to 16 inclusive we provide a second form of a detachable head cigar lighter similar to the form shown in Figs. 1 to 7 inclusive except that we have provided means comprising central and annular socket members on the head cooperating respectively with central and annular plug members on the base, one socket and plug member connecting one end of the coil with a terminal, and the other socket and plug connecting the other end of the coil with the switch movable member. The first form shown in Figs. 1 to 7 has a central socket and annular plug on the head cooperating respectively with a central plug and annular socket on the base.

The base 20 has an aperture 21 which receives a tubular conductor 22. A cup-shaped plug member 123 engages one side of the base and is in turn engaged by an annular flange 25 of the tubular conductor 22, thereby electrically connecting the conductor 22 with the plug member 123 and securely attaching the plug member 123 to the base 20. The conductor 22 extends from the side of the base opposite the plug 123 and extends through an aperture in a resilient contact or blade 26. This end of the conductor 22 is spun over the contact or blade 26 to firmly hold the contact against the base, and thereby electrically connecting the plug member 123 and the contact 26.

An insulating disc or bushing 29 is provided within the plug 123. An aperture in said disc, concentric of the plug 123 is in axial alignment with a similar aperture in the cover plate 28.

Figure 8:
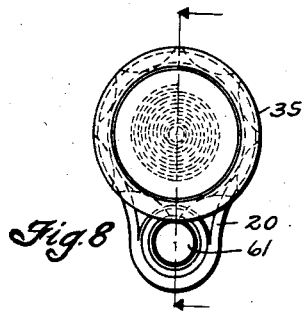
Fig. 8 is a front view of a modified form of the device.
Figure 9:
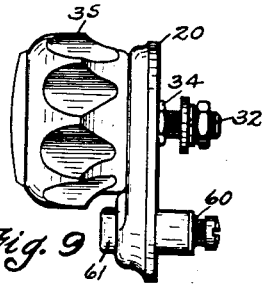
Fig. 9 is a side view of Fig. 8.
Figure 14:
Fig. 14 is a detail view of a tension member of the device.
Figure 10:
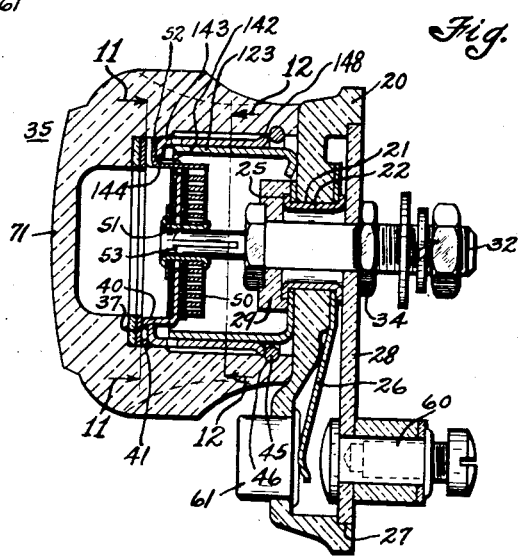
Fig. 10 is an enlarged sectional view taken on the line 10—10 of Fig. 8.
Figure 13:
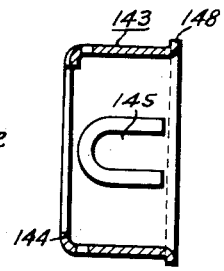
Fig. 13 is a detail sectional view of a socket member shown in Fig. 10.
Figure 11:
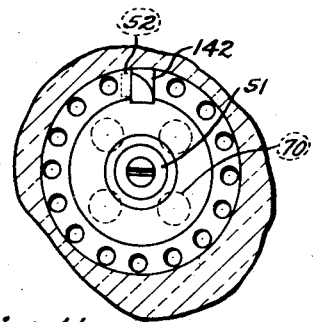
Fig. 11 is a sectional view taken on the line 11—11 of Fig. 10.
Figure 12:
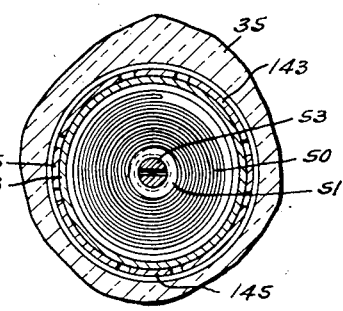
Fig. 12 is a sectional view taken on the line 12—12 of Fig. 10.
Figure 16:
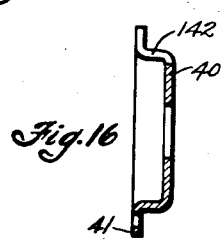
Figs. 15 and 16 are plan and sectional views respectively of the heating coil supporting cage shown in Fig. 10.
Figure 15:
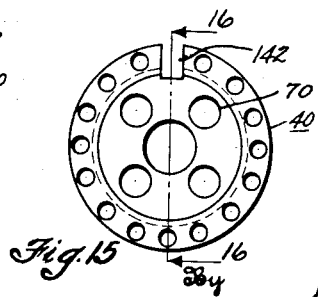

The detachable head in the second form shown in Figs. 8 to 16, is assembled similar to the first form except that a socket member 143 having an inwardly extending flange 144 engages the cup-shaped member 40. The annular wall of the socket member 143 is provided with a plurality of tongues 145 of a flexible nature. The flange 41 of the cup-shaped member 40 is maintained against the tensioning member 37 by the flange 144 of the socket member 143, which flange 144 is adapted to engage the flange 41 of the cup-shaped member 40.

The snap ring 45 fitting into an annular groove 46 provided in the interior surface of the open end of the detachable head 35 engages at outwardly turned edge 148 of the socket member 143 to maintain the socket member 143 and the cup-shaped member 40 in proper position within the detachable head 35.

One end of the heating unit 50 is in electrical engagement with the hollow rivet and socket member 51, supported by the cup-shaped member 40, but insulated therefrom. The other end of the heating unit 50 has an angular projection 52 which extends through the notch 142 of the cup-shaped member 40.

When the detachable head 35 is placed in position upon the base 20, the hollow rivet or socket member 51 will receive the bifurcated end 53 of the post 32, and the socket member 143 will receive the plug member 123 of the base 20, so that the outer end of the heating unit 50 will be in electrical connection with the plug 123 through the socket member 143.

When it is desired to use the device, shown in Figs. 8 to 16, the push button 61 is pressed so that the contact 26 will engage the terminal 60 completing a circuit through the device through the following elements: ground, 60, 26, 22, 123, 143, 52, 40, 50, 51, 53, and 32 then to a source of current and ground. With the continued depression of the button 61 the current will flow through the heating unit 50, causing the unit to glow which may be seen through the insulating material over a plurality of apertures 70 in the member 40, and thence through the thin portion 71 of the detachable head 35. When the glow is visible, the detachable head may be removed from the base 20. In the removal, the tubular rivet 51 is removed from the bifurcated end 53 and the socket member 143 from the plug 123.

From the foregoing description of the construction of the second form, we have provided a detachable head cigar lighter comprising a base 20, terminals 32 and 60 supported by the base 20, a switch supported by the base and comprising a contact 26 movable into connection with the terminal 60, a heating coil 50, a head 35 for supporting the coil 50, and means for attaching the head 35 to the base 20 for electrically connecting the heating coil 50 with the terminals 32 and 60, said means comprising socket members 51 and 143, of the head 35 cooperating respectively with plug members 53 and 123 on the base 20, socket member 51 and plug 53 connecting one end of the coil 50 with the terminal 32, and the socket member 143 and plug 123 connecting the other end of the coil 50 with the movable contact 26.

While we have illustrated two forms of embodiment of the present invention as herein disclosed, it is to be understood that other forms might be adopted, all coming within the scope of the claims which follow, and we do not therefore desire to be limited to the specific forms illustrated.

What is claimed is as follows:

1. A detachable head cigar lighter comprising in combination; a head of one piece having a cavity open at one end; a shoulder within the cavity and adjacent the closed end wall of the head; a heating unit having a rim; an annular connector having a flange; means cooperating with said annular connector for holding said rim and flange against said shoulder securing the heating unit and the annular connector in the cavity of the head; and a base having a socket member cooperating with the annular connector on the head to hold the head on said base yet permit quick removal thereof.

2. A detachable head cigar lighter comprising in combination; a head formed of one piece and having a cavity open at one end; a shoulder on the head adjacent the closed end wall, a heating unit; a plug; a snap ring securing the heating unit and the plug in the cavity adjacent said shoulder of the head; and a base having a socket member cooperating with the plug on the head to hold the head on the base yet permit removal thereof.

3. A detachable head cigar lighter comprising in combination, a head made of one piece and having a cavity open at one end; a shoulder on the head adjacent the closed end wall of the head; a heating unit; a connector; an annular spacer having an inwardly extending flange bearing against the connector for holding said connector and heating unit adjacent said shoulder; means for securing the spacer in the head; and a base having a socket member cooperating with the connector on the head to yieldingly hold said head on said base.

4. A detachable head cigar lighter comprising in combination; a head made of one piece and having a cavity open at one end; a shoulder on the head adjacent the closed end wall of the head, a heating unit; a connector; an annular spacer having an inwardly extending flange bearing against the connector for holding said heating unit and connector adjacent said shoulder; a snap ring engaging an edge of the spacer for securing the spacer in the head; and a base having a socket member cooperating with the connector on the head to yieldingly hold the head on the base.

5. A detachable head cigar lighter comprising, in combination; a base; terminals insulatingly supported by the base, one of said terminals forming a central plug, said central plug insulatingly supporting a concentric annular plug on said base; a switch supported by the base and comprising a contact movable into connection with one of said terminals; a heating coil; a head for supporting the coil; and means for attaching the head to the base for electrically connecting the heating coil with the terminals, said means comprising a central socket and a concentric socket carried by the head cooperating respectively with said central plug and said concentric annular plug on the base.

6. A detachable head cigar lighter comprising, in combination; a base; terminals insulatingly supported by the base; one of said terminals forming a plug; a second plug insulatingly supported by said base; a switch supported by the base and comprising a contact movable into connection with one of said terminals; a heating coil; a head made of one piece and provided with a cavity for enclosing and for supporting the coil; a socket contact carried by the head and electrically connected to one end of the heating coil, and engaging a plug member on the base; and a second socket member carried by the head and connectible with a second plug member carried by the base for electrically connecting the other end of the heating coil with the switch movable contact.

7. A detachable head cigar lighter comprising in combination; a base; terminals insulatingly supported by the base, one of said terminals forming a plug, said plug insulatingly supporting a second plug on said base; a switch supported by the base and including a resilient blade movable into contact with one of said terminals; a heating coil; a head for supporting the coil; and means for attaching the head to the base for electrically connecting the coil with the terminals, said means comprising a pair of sockets carried by the head cooperating with the plugs on the base.

8. A detachable head cigar lighter comprising in combination; a head formed of one piece and having a cavity open at one end; a shoulder within the cavity and adjacent the closed end wall of the head; a heating unit having an annular rim portion, said unit having a socket member supported thereby; a plug member having a rim portion; a sleeve; a snap ring cooperating with said sleeve member for holding the heating unit and the plug adjacent said shoulder of the head; a base; terminals insulatingly supported by the base, one of said terminals forming a plug member and insulatingly supported by a socket member carried by said base, said plug and socket members carried by the base cooperating with the socket and plug members of the head for yieldingly holding the head on the base; a blade spring supported on said base and in electrical connection with said socket member; and means for moving said blade into contact with one of said terminals.

WILLIAM H. HUTCHINS.
THOMAS L. LEE.